United States Patent
DeMars

(10) Patent No.: US 7,222,619 B2
(45) Date of Patent: May 29, 2007

(54) STORABLE SHELVES FOR A BARBECUE

(75) Inventor: Robert A. DeMars, Woodland Hills, CA (US)

(73) Assignee: Original Ideas, Inc, LaQuinta, CA (US)

( * ) Notice: Subject to any disclaimer, the term of this patent is extended or adjusted under 35 U.S.C. 154(b) by 356 days.

(21) Appl. No.: 10/916,657

(22) Filed: Aug. 12, 2004

(65) Prior Publication Data

US 2006/0032489 A1  Feb. 16, 2006

(51) Int. Cl.
*A47J 37/07* (2006.01)

(52) U.S. Cl. .......................... 126/38; 126/40; 126/50; 126/332; 126/333; 122/41 R; 122/9 R

(58) Field of Classification Search .............. 126/25 R, 126/39 R, 41 R, 52, 37 B, 38, 332, 333
See application file for complete search history.

(56) References Cited

U.S. PATENT DOCUMENTS

| | | | |
|---|---|---|---|
| 206,252 A * | 7/1878 | Lawson | 126/211 |
| 335,627 A * | 2/1886 | Richmond | 126/333 |
| 345,545 A * | 7/1886 | Ringen | 126/214 R |
| 626,838 A * | 6/1899 | Low | 126/211 |
| 652,170 A * | 6/1900 | Dibble | 126/260 |
| 732,470 A * | 6/1903 | Tatham, Jr. | 126/39 R |
| 823,778 A * | 6/1906 | Herbeck | 312/200 |
| 823,901 A * | 6/1906 | Sturr | 312/216 |
| 948,717 A | 2/1910 | Avery | |
| 1,139,212 A | 5/1915 | Morgan | |
| 1,153,597 A * | 9/1915 | Buttler | 312/236 |
| 1,302,911 A | 5/1919 | Gilbert | |
| 1,423,612 A * | 7/1922 | Jewett | 211/85.31 |
| 1,438,345 A | 12/1922 | Tait et al. | |
| 1,478,371 A | 12/1923 | Albrighton | |
| 1,483,159 A | 2/1924 | Coleman | |
| 1,531,405 A | 3/1925 | Lehman | |
| 1,600,830 A * | 9/1926 | Lewis | 312/227 |
| 1,654,330 A | 12/1927 | Jenkins | |
| 1,831,401 A * | 11/1931 | Weidlich et al. | 312/324 |
| D91,639 S | 2/1934 | Stulik | |
| 1,952,776 A | 3/1934 | Quinlin | |

(Continued)

FOREIGN PATENT DOCUMENTS

FR  2539846  *  7/1984

*Primary Examiner*—Carl D. Price
(74) *Attorney, Agent, or Firm*—Dan M. DeLaRosa

(57) ABSTRACT

A barbecue has a pair of storable shelves mounted on opposite portions of the barbecue housing adjacent the upper open end of the housing. The shelves are rotatable about generally vertical pivot axes so that each can be swung between a first position for use outside the housing and a second position for storage inside the housing. The shelves are positioned, one over the other, for storage inside the housing when each is in the second position. Swinging movement of each of the shelves between the first and second position is provided by a downwardly extending shaft at an end of a bracket on which the shelf is mounted, which shaft is rotatably received within a mating vertical aperture in a mounting assembly mounted at the inside surface of the barbecue housing. Recesses in the shelf brackets permit the brackets to be positioned over and to nest on the rim of the housing when in the first position outside of the housing.

11 Claims, 1 Drawing Sheet

U.S. PATENT DOCUMENTS

| | | | |
|---|---|---|---|
| 2,021,915 A | 11/1935 | Hancook et al. | |
| 2,154,305 A | 4/1939 | Goerl | |
| 2,246,440 A | 6/1941 | Hester | |
| 2,484,239 A | 10/1949 | Moon et al. | |
| 2,559,710 A | 7/1951 | Danielson | |
| 2,742,892 A | 4/1956 | Herzer | |
| 2,768,042 A * | 10/1956 | Persinger et al. | 108/152 |
| 2,791,959 A * | 5/1957 | Pirz | 99/421 R |
| 2,816,538 A * | 12/1957 | Miller et al. | 126/25 R |
| 2,944,862 A * | 7/1960 | Heil | 312/237 |
| 2,985,164 A | 5/1961 | Imoto | |
| 3,005,451 A | 10/1961 | Richart | |
| 3,094,113 A * | 6/1963 | Avila | 126/30 |
| 3,330,266 A | 7/1967 | Stephen | |
| 3,338,628 A * | 8/1967 | Evans | 297/188.2 |
| 3,459,171 A | 8/1969 | Swansen | |
| 3,611,912 A | 10/1971 | Choe | |
| 3,665,913 A | 5/1972 | Cagle, Jr. | |
| D229,660 S | 12/1973 | Gammon | |
| 3,791,368 A | 2/1974 | Hunt et al. | |
| 3,791,370 A | 2/1974 | Fauser | |
| 3,915,529 A * | 10/1975 | Bernier | 312/237 |
| 4,089,554 A * | 5/1978 | Myers | 296/37.1 |
| D251,893 S | 5/1979 | Chan | |
| 4,170,173 A | 10/1979 | Bradford | |
| 4,239,308 A * | 12/1980 | Bradley | 312/201 |
| 4,363,313 A * | 12/1982 | Smith | 126/9 R |
| D285,522 S | 9/1986 | Basini | |
| 4,616,624 A | 10/1986 | Parker | |
| 4,677,964 A | 7/1987 | Lohmeyer et al. | |
| D291,399 S | 8/1987 | Chan | |
| 4,717,024 A * | 1/1988 | Djezovic | 206/581 |
| 4,798,413 A * | 1/1989 | Capelli | 297/161 |
| 5,069,196 A * | 12/1991 | Schlosser et al. | 126/25 R |
| 5,076,256 A | 12/1991 | Raymer et al. | |
| 5,090,398 A | 2/1992 | Raymer et al. | |
| D325,123 S * | 4/1992 | Tiramani | D3/275 |
| D325,318 S | 4/1992 | Parent et al. | |
| 5,109,834 A | 5/1992 | Collins et al. | |
| 5,184,599 A * | 2/1993 | Stuart | 126/25 R |
| 5,293,859 A | 3/1994 | Lisker | |
| 5,359,988 A | 11/1994 | Hait | |
| 5,452,707 A | 9/1995 | Harris et al. | |
| 5,471,916 A | 12/1995 | Bird et al. | |
| 5,617,779 A | 4/1997 | Dutczak | |
| 5,694,917 A * | 12/1997 | Giebel et al. | 126/41 R |
| 5,832,915 A | 11/1998 | Skidmore et al. | |
| 5,873,355 A | 2/1999 | Schlosser et al. | |
| 5,899,526 A * | 5/1999 | LaPointe et al. | 297/173 |
| 5,941,229 A | 8/1999 | Schlosser et al. | |
| 5,960,788 A | 10/1999 | Bach et al. | |
| 5,970,971 A | 10/1999 | Wu | |
| 6,131,562 A | 10/2000 | Schlosser et al. | |
| 6,142,140 A * | 11/2000 | Shumaker | 126/9 B |
| 6,254,160 B1 | 7/2001 | Marriott et al. | |
| 6,293,272 B1 * | 9/2001 | Harneit | 126/37 B |
| 6,302,097 B1 | 10/2001 | Rivera | |
| 6,308,616 B1 | 10/2001 | Johnson | |
| D450,524 S | 11/2001 | Measom | |
| D457,030 S | 5/2002 | DeMars | |
| D457,776 S | 5/2002 | DeMars | |
| D458,506 S | 6/2002 | DeMars | |
| 6,439,220 B1 | 8/2002 | Johnson | |
| 6,606,987 B2 | 8/2003 | DeMars | |

* cited by examiner

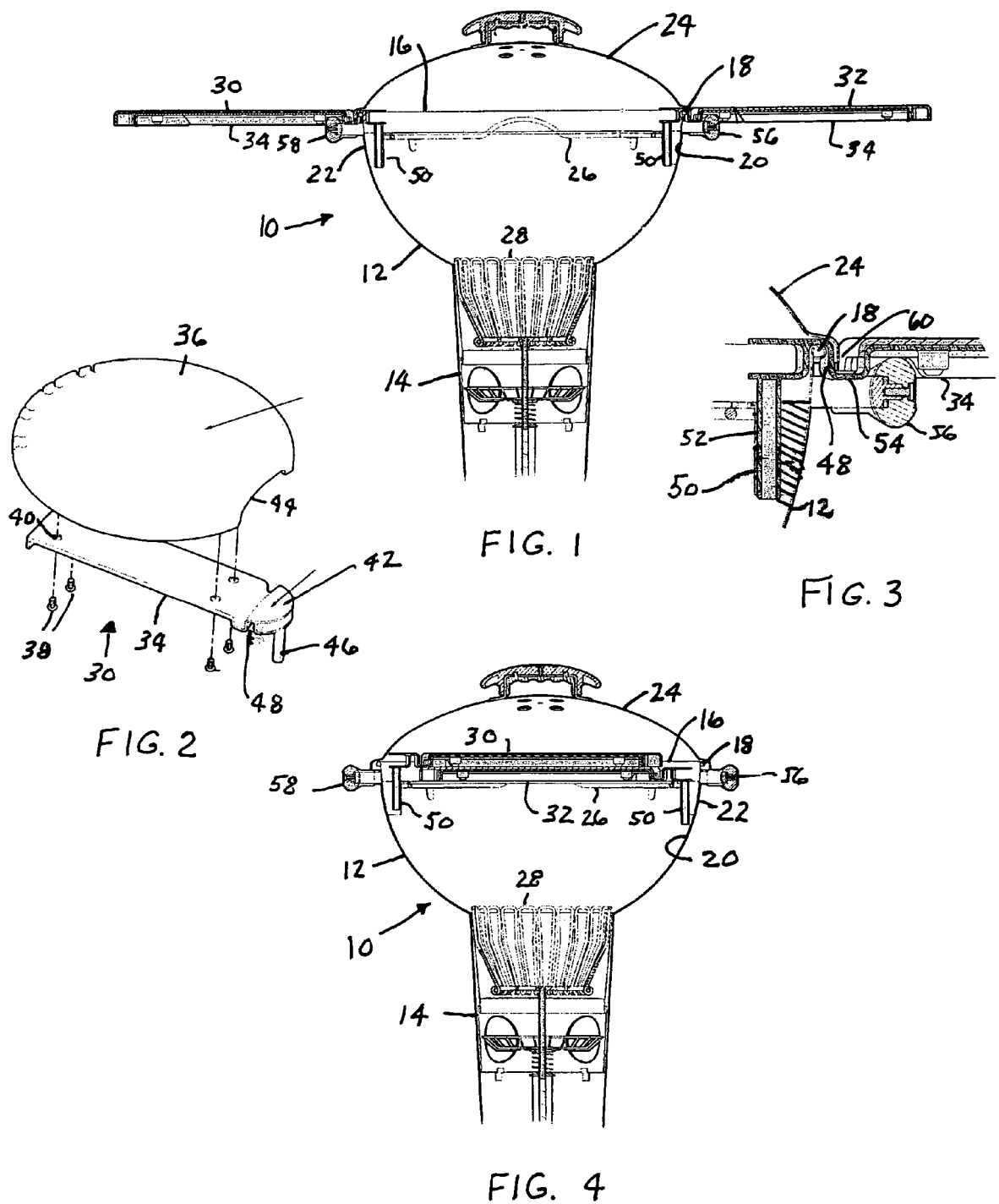

STORABLE SHELVES FOR A BARBECUE

BACKGROUND OF THE INVENTION

1. Area of the Art

The present invention relates to cooking appliances such as barbecues, and more particularly to barbecues having one or more shelves associated therewith.

2. Description of the Prior Art

It is known in the art to provide a cooking appliance such as a barbecue having one or more shelves associated therewith. The shelves may be movably attached to the barbecue so that they can be moved into a position of use such as outside of the barbecue for storage of food and implements thereon, and also movable into a position for storage of the shelves such as at the inside of the barbecue. Published U.S. Application No. 2003/0192526 of DeMars shows various embodiments of a barbecue in which opposite shelves are folded over for storage inside the barbecue and are unfolded to the outside of the barbecue for use. Published U.S. Application No. 2003/0111070 of DeMars and U.S. Pat. No. 6,606,987 of DeMars have similar disclosures. Published U.S. Application No. 2003/0111070 of DeMars also shows a barbecue with hinging shelves.

Still further examples of barbecues with hinging shelves are provided by published U.S. Application No. 2003/0079737 of Wu and U.S. Pat. No. 6,513,515 of Wu.

Published U.S. Application No. 2002/0050274 of Hamilton et al. describes a portable stove having opposite hinging shelves that cover the top of the stove when pivoted to an inner position. U.S. Pat. No. 5,016,607 of Doolittle describes opposite shelves which remain outside of a barbecue and which are hinged and can be raised and lowered. The hinges have latching mechanisms to latch the shelves in a raised position. U.S. Pat. No. 4,166,413 of Meszaros also describes a barbecue having shelves which are raised and lowered. U.S. Pat. No. 2,541,528 of McAvoy describes an arrangement of opposite hinging shelves similar to that in published U.S. application Ser. No. 0050274 of Hamilton.

The various examples of the prior art discussed above describe barbecues having shelves which are hinged or otherwise pivotable about horizontal axes so that they fold to the inside of the barbecue for storage and to the outside of the barbecue for use. However, it may be desirable to provide other configurations and arrangements in which shelves are movable between a position on the inside of the barbecue for storage and a position on the outside of the barbecue for use.

SUMMARY OF THE INVENTION

The present invention provides a barbecue having at least one storable shelf rotatable about a generally vertical pivot axis between a storage position inside the housing of the barbecue and a use position at the outside of the barbecue housing. The housing of the barbecue has an open upper end and inner and outer surfaces. A mounting assembly is mounted on the inner surface of the housing adjacent the open upper end and has a generally vertical aperture therein. The at least one shelf includes an elongated shelf bracket having a shaft extending downwardly from an end thereof, with the shaft being rotatably received within the generally vertical aperture in the mounting assembly. A flat, generally disk-shaped shelf is mounted on the elongated shelf bracket. The rotatable receipt of the shaft within the generally vertical aperture enables pivoting movement of the elongated shelf bracket relative to the mounting assembly to swing the shelf between a storage position inside the housing and a use position outside the housing.

The housing has a rim at the open upper end thereof between the inner and outer surfaces. The elongated shelf bracket has a recess therein at the end thereof adjacent the shaft which receives the rim of the housing to seat the shelf bracket on the rim when the shelf is swung into the use position outside the housing. The elongated shaft bracket also has a portion thereof adjacent the recess which rests on and is supported by a handle mounted on the outer surface of the housing when the shelf is in the use position outside the housing. A second recess in the elongated shelf bracket receives the lower edge of a lid which may be placed over the open upper end of the housing, when the shelf is in the use position outside the housing.

In another embodiment, the barbecue has a pair of the shelves mounted on opposite portions of the housing. The pair of shelves are positioned, one over the other, for storage inside the housing when each of the shelves is swung into the storage position. When in the use positions, each of the shelves extends outwardly from the opposite sides of the barbecue housing. The barbecue has an opposite pair of the handles which provide support for the elongated support brackets of the shelves in addition to the positioning of the rim within the recesses in the elongated support brackets when the shelves are in the use position outside of the barbecue housing.

DESCRIPTION OF THE FIGURES

FIG. 1 is a front sectional view of a barbecue with storable shelves in accordance with the invention.

FIG. 2 is an exploded perspective view of one of the shelf assemblies of the barbecue of FIG. 1.

FIG. 3 is an enlarged sectional view of a portion of FIG. 1 showing the details of the manner in which one of the shelf assemblies is positioned and supported when in the use position outside of the barbecue.

FIG. 4 is a front sectional view similar to the view of FIG. 1 but with the two shelf assemblies positioned in overlapping relation for storage within the barbecue.

DETAILED DESCRIPTION OF THE INVENTION

FIG. 1 shows a barbecue having storable shelves in accordance with the invention. The barbecue 10 includes a housing 12 mounted at the top of an upright stand 14. The housing has an upper open end 16 having a circular rim 18 between an inside surface 20 and an outside surface 22 of the housing 12. The open upper end 16 may be enclosed by a mating lid 24 which can be placed over the rim 18 of the housing 12.

The barbecue 10 includes a grate 26 positioned at the inside of the housing 12 just below the rim 18. Food to be cooked is placed on the grate 26 and is heated by charcoal containing apparatus 28 positioned below the grate 26. Such details are unimportant to the storable shelves in accordance with the present invention. However, reference is made to co-pending application Ser. No. 10/359,804 filed on Feb. 7, 2003 by Alan D. Crawford et al. and entitled "QUICK START BARBECUE", for a detailed example of a barbecue which may be used with the storable shelves in accordance with the present invention.

In accordance with the invention, the barbecue 10 has a pair of opposite shelf assemblies 30 and 32 mounted on the housing 12 at opposite sides thereof. The shelf assemblies 30 and 32 are pivotable about vertical axes, and can be swung between use positions outside of the housing 12 and storage positions within the housing 12. The shelf assemblies 30 and 32 are shown in the use positions outside of the housing 12 in the view of FIG. 1. When in the use positions, the shelf assemblies 30 and 32 extend outwardly from the opposite sides of the housing 12 with a function to receive and support food containers, cooking utensils and other such objects. When the shelf assemblies 30 and 32 are swung to the opposite storage positions, they reside in overlapping relation for storage within the housing 12, as shown in FIG. 4.

FIG. 2 is an exploded perspective view of one of the shelf assemblies 30. The other shelf assembly 32 is of identical configuration. As shown in FIG. 2, the shelf assembly 30 includes an elongated shelf bracket 34 on which is mounted a shelf 36. In the present example, the shelf 36 is of thin, disk-shaped configuration, and is secured to the shelf bracket 34 by a plurality of screws 38 which extend upwardly through holes 40 in the elongated shelf bracket 34 and into the shelf 36.

The elongated shelf bracket 34 has an end 42 which extends by a small amount beyond an adjacent edge 44 of the shelf 36. The end 42 has a generally cylindrical shaft 46 extending downwardly therefrom. The end 42 of the shelf bracket 34 also has a recess 48 therein adjacent the shaft 46.

As shown in FIGS. 1 and 4, the barbecue 10 is provided with an opposite pair of mounting assemblies 50. The mounting assemblies 50 which are mounted on the inside surface 20 of the housing 12 just below the rim 18 of the open upper end 16 are each provided with a vertical aperture 52 extending downwardly therethrough. Each of the vertical apertures 52 is of generally cylindrical configuration and receives a shaft 46 of the shelf bracket 34 of one of the shelf assemblies 30 and 32. The shafts 46 are free to rotate within the apertures 52, thereby permitting the shelf assemblies 30 and 32 to undergo swinging motion between use positions outside the barbecue housing 12 and the storage positions inside of the housing 12. The shafts 46 can also undergo vertical movement relative to the apertures 52, permitting the shelf assemblies 30 and 32 to be raised for movement between the storage and use positions as well as for storage in overlapping relationship within the housing 12 as described below.

FIG. 3 is a detailed view of the right hand shelf assembly 32 when in the use position outside of the barbecue housing 12. In this position, the rim 18 of the housing 12 extends into the recess 48 of the elongated shelf bracket 34, enabling the shelf assembly 32 to nest on the rim 18. At the same time, a portion 54 of the shelf bracket 34 rests on a handle 56 attached to the outside surface 22 of the barbecue housing 12, to provide further support for the shelf assembly 32. The left hand shelf assembly 30 functions in similar fashion, and nests on the rim 18 and is supported in part by a handle 58 mounted on the outside surface 22 of the barbecue housing 12 opposite the handle 56.

As shown in FIG. 3 each of the elongated shelf brackets 34 has a recess 60 extending therein from an upper surface thereof adjacent the first recess 48. The recess 60 receives a lip at a lower edge of the lid 24 therein when the shelf is in the use position and the lid 24 is placed over the open upper end 16 of the housing 12.

The opposite shelf assemblies 30 and 32 are placed in the use positions outside of the barbecue housing 12 by lifting and then lowering each shelf assembly 30 and 32 as necessary so that the recess 48 in each shelf bracket 34 is positioned over the rim 18 of the housing 12, and the portion 54 of each is disposed on a respective one of the handles 56 and 58. This position is shown in FIG. 1 as well as in the detailed view of FIG. 3.

Movement of the shelf assemblies 30 and 32 into the housing 12 for storage therein is accomplished by again lifting each of the shelf assemblies 30 and 32 as necessary so that the rim 18 is free of the recess 48 in each of the shelf brackets 34. Each of the shelf assemblies 30 and 32 is then swung inwardly, allowing the shafts 46 to rotate within the vertical apertures 52 in the mounting assemblies 50, until the shelf assemblies 30 and 32 are disposed at the inside of the housing 12. The shelf assemblies 30 and 32 are moved into the storage position at the inside of the housing 12 in succession, with one being moved into the storage position followed by the other being moved into the storage position. In the example of FIG. 4, the right hand shelf assembly 32 is the first to have been moved into the storage position. Where it reaches the interior of the housing 12, the shelf assembly 32 is lowered onto the grate 26. Again, upward and downward movement of the shelf assemblies 30 and 32 as they are swung back and forth in this fashion is permitted by vertical movement of the shafts 46 within the vertical apertures 52. Following disposition of the right hand shelf assembly 32 onto the grate 26, the left hand shelf assembly 30 is raised and swung to the inside of the housing 12 where it is placed on top of the first shelf assembly 32. The order of placement of the shelf assemblies 30 and 32 at the interior of the housing 12 is unimportant, and the left hand shelf assembly 34 can be positioned there first with the right hand shelf assembly 32 being next swung into the interior of the housing 12 for placement on top of the shelf assembly 30.

What is claimed is:

1. A barbecue and cooking apparatus comprising:
    a grill body comprising at least one cooking chamber, said grill body having an open upper end, said grill body having an external surface;
    at least two apertures situated adjacent to said grill body;
    at least two handles; and
    at least two swing-out shelf assemblies, each of said assemblies comprising at least one bracket with opposing ends, a first end having a shelf and a second end comprising at least one shaft extending downwardly therefrom and designed to fit and rotate within each of said apertures, each of said brackets having a recess, wherein each of said shelf assemblies can be swung between a first position for use and a second position for storage wherein said shelf is situated above said upper end of said grill body, said grill body further comprising a rim situated around said upper end, said recess of said bracket being designed for receiving said rim of said grill body to thereby support said bracket when said shelf is in said first position, said handles being connected to said external surface of said grill body and are situated below areas where said shelf assemblies are situated during said first position and to thereby support said shelf assemblies during said use position.

2. A barbecue apparatus comprising:
    a grill body comprising at least one cooking chamber, said grill body comprising at least one aperture and a fire bowl having a topside opening, said grill body comprises a rim situated adjacent to said topside opening of said fire bowl, said grill body further comprises an external surface and at least one handle attached to said external surface;

at least one lid, said lid being designed to cover said topside opening of said fire bowl during a closed position; and at least one shelf assembly comprising at least one support bracket with opposing ends, a first end having a shelf and a second end comprising at least one shaft extending downwardly therefrom and designed to fit and rotate within said aperture of said grill body whereby said shelf can be swung on a horizontal plane between a first position for use and a second position for storage, said shaft is generally perpendicular to said shelf and said bracket, at least a portion of said shelf being situated away from said topside opening of said fire bowl in said first position and said shelf is situated above said topside opening of said fire bowl during said second position, said support bracket having a recess for receiving said rim of said grill body to thereby support said bracket when said shelf is in said first position, said shelf assembly capable of being in said first use position when said lid is in said closed position, said handle being situated below an area where said shelf is situated during said first position to thereby support said shelf during said use position.

3. The apparatus of claim 2 further comprising mounting assemblies for mounting said shelf assembly to said grill body, said mounting assembly comprising at least one aperture for receiving said shaft of said bracket of said shelf assembly.

4. The apparatus of claim 2 further comprising a stand.

5. The apparatus of claim 2 further comprising a second aperture on said grill body and a second shelf assembly comprising at least one support bracket with opposing ends, a first end having a shelf and a second end comprising at least one shaft extending downwardly therefrom and designed to fit and rotate within said second aperture of said grill body, wherein said second shelf can be swung on a horizontal plane between a first position for use away from said topside opening of said fire bowl and a second position for storage wherein said shelf is situated above said topside opening of said fire bowl.

6. The apparatus of claim 5 wherein said first shelf is situated above said second shelf during said storage position and said first and second shelves are situated above said topside opening of said fire bowl.

7. The apparatus of claim 5 wherein said first and second shelves are positioned side by side during said storage position and said first and second shelves are situated above said topside opening of said fire bowl.

8. A barbecue apparatus comprising:

a grill body comprising at least one cooking chamber with a firebowl, said grill body having an open upper end and a rim situated at said oven upper end, said grill body further comprises an external surface and at least one handle attached to said external surface;

at least one horizontal mounting assembly, said mounting assembly comprising at least one aperture;

a removable lid situated over said grill body to enclose said open upper end of said grill body in a closed position; and at least one shelf assembly comprising at least one support bracket with opposing ends, a first end having a shelf and a second end comprising at least one shaft extending downwardly therefrom and designed to fit and rotate within said aperture of said mounting assembly, wherein said shelf can be swung on a vertical axis between a first position away from said open upper end of said grill body and a second position for storage wherein said shelf is situated above open upper end of said grill body, said shaft is generally perpendicular to said shelf and said bracket, said support bracket having a recess for receiving said rim of said grill body to thereby support said bracket when said shelf is in said first position, said shelf assembly capable of being in said first use position when said lid is in said closed position, said handle being situated below an area where said shelf is situated during said first position to thereby support said shelf during said use position.

9. The apparatus of claim 8 further comprising a second aperture on said grill body and a second shelf assembly comprising at least one support bracket with opposing ends, a first end having a shelf and a second end comprising at least one shaft extending downwardly therefrom and designed to fit and rotate within said second aperture of said grill body, wherein said second shelf can be swung on a vertical axis between a first position for use and a second position for storage.

10. The apparatus of claim 9 wherein said first shelf is situated above said second shelf during said storage position and said first and second shelves are situated above said upper end of said grill body.

11. The apparatus of claim 9 wherein said first and second shelves are positioned side by side during said storage position and said first and second shelves are situated above said upper end of said grill body.

* * * * *